United States Patent [19]

Siegenthaler

[11] Patent Number: 5,344,514

[45] Date of Patent: Sep. 6, 1994

[54] METHOD OF PRODUCING A TOROIDAL ROAD VEHICLE TIRE CARCASS

[75] Inventor: Karl J. Siegenthaler, Rome, Italy

[73] Assignee: Bridgestone Corporation, Tokyo, Japan

[21] Appl. No.: 90,867

[22] Filed: Jul. 13, 1993

[30] Foreign Application Priority Data

Jul. 21, 1992 [IT] Italy ............... 000620 A/92

[51] Int. Cl.⁵ ............................................. B29D 30/34
[52] U.S. Cl. ............................ 156/117; 152/548; 152/563
[58] Field of Search ............ 156/117, 397, 130.7, 156/148; 152/563, 548

[56] References Cited

U.S. PATENT DOCUMENTS

| | | | |
|---|---|---|---|
| 610,310 | 9/1898 | Sloper | 152/563 |
| 649,720 | 5/1900 | Duryea | 152/563 |
| 1,057,232 | 3/1913 | Gammeter | 152/563 |
| 1,374,408 | 4/1921 | Trogner | 156/117 |
| 4,277,295 | 7/1981 | Schmidt et al. | 156/117 |

FOREIGN PATENT DOCUMENTS

| | | |
|---|---|---|
| 0141942 | 8/1984 | European Pat. Off. . |
| 0489353 | 11/1991 | European Pat. Off. . |
| 0489354 | 11/1991 | European Pat. Off. . |

*Primary Examiner*—Geoffrey L. Knable
*Attorney, Agent, or Firm*—David A. Thomas

[57] ABSTRACT

A toroidal road vehicle tire carcass (1) having two annular beads (2) connected by a toroidal reticulated structure (4) defined by a number of elongated reinforcing elements located between and extending substantially radially in relation to the beads (2), is formed from a single continuous cord (5) for forming a succession of substantially identical groups (6) of elongated reinforcing elements, wherein each group (6) is defined by a first (7) and second (8) U-shaped loop having respective open ends (10) and respective closed ends (11) arranged along an annular interconnection line (9) extending centrally in relation to the beads (2). Each loop (7, 8) is wound about a respective bead (2), and has an open end (10) engaging the closed end (11) of the other loop (8, 7).

5 Claims, 1 Drawing Sheet

METHOD OF PRODUCING A TOROIDAL ROAD VEHICLE TIRE CARCASS

BACKGROUND OF THE INVENTION

1. Technical Field

The present invention relates to a method of producing a toroidal road vehicle tire carcass. More specifically, the present invention relates to a straightforward, low-cost method of producing a toroidal radial tire carcass comprising two annular beads connected by a toroidal reticulated structure, in turn comprising a number of elongated reinforcing elements connecting and extending substantially radially in relation to the beads.

SUMMARY OF THE INVENTION

According to the present invention, there is provided a method of producing a toroidal road vehicle tire carcass comprising two parallel annular beads, and a toroidal reticulated structure connecting the two beads and comprising a number of elongated reinforcing elements located between and extending substantially radially in relation to the beads; said method being characterized by the fact that said elongated reinforcing elements are formed from a single continuous cord wound in such a manner as to form a succession of substantially identical groups of elongated reinforcing elements, wherein each group is defined by a first and second U-shaped loop having respective open ends and respective closed ends arranged side by side along an annular interconnection line lying substantially in a plane between the bead planes; each loop being wound about a respective one of said beads, and having the open end engaging the closed end of the other loop.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
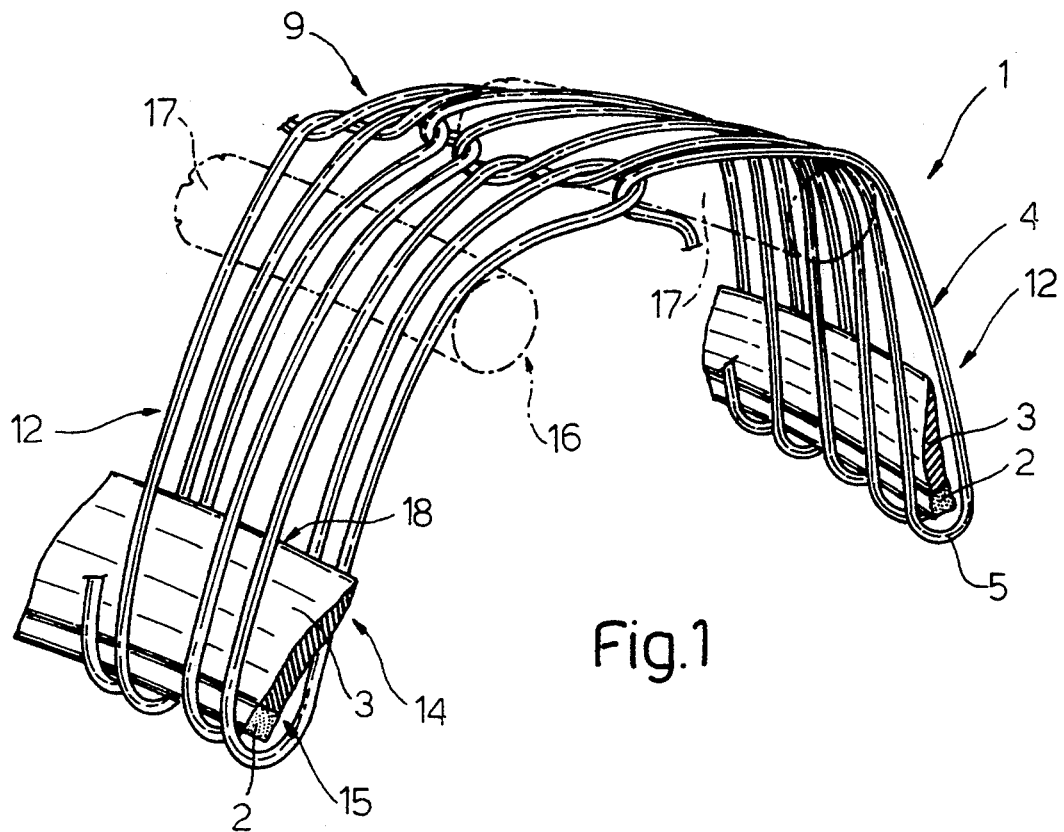
FIG. 1 shows a schematic view in perspective of a portion of a carcass formed using the method according to the present invention.
Figure 2:
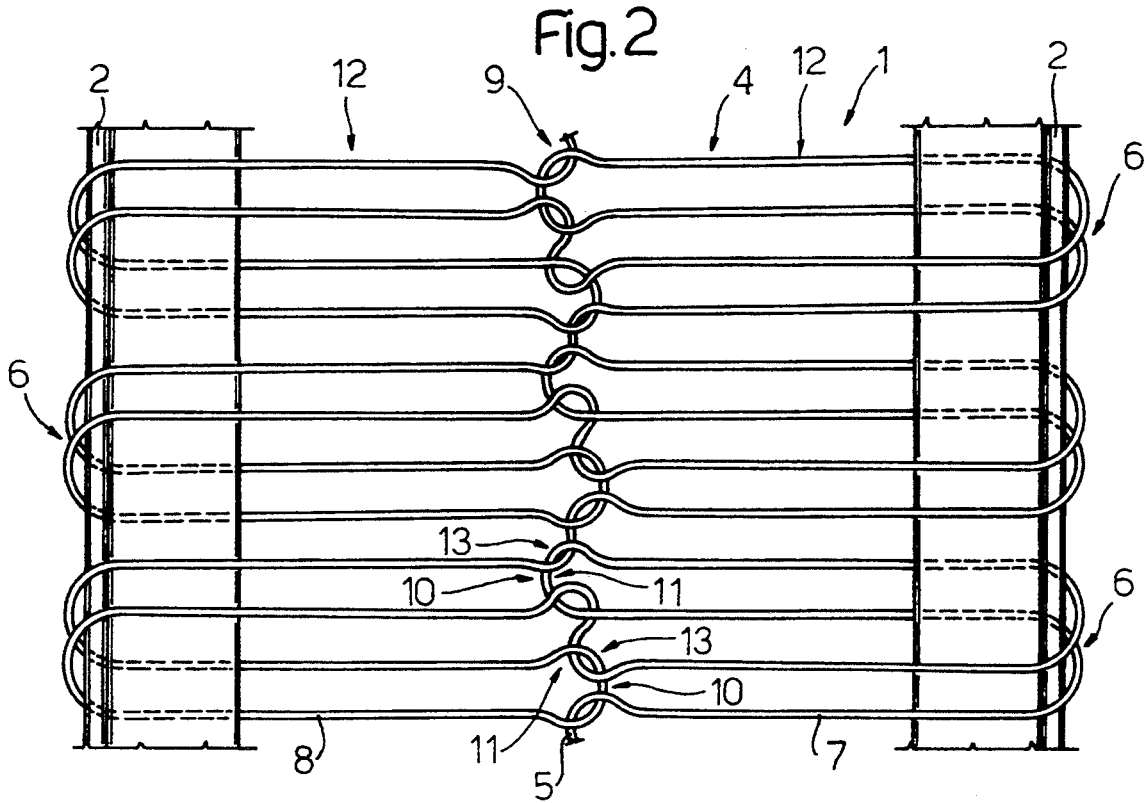
FIG. 2 shows a spreadout view of the FIG. 1 carcass portion.

Number 1 in FIG. 1 indicates a toroidal road vehicle tire carcass. Carcass 1 comprises two annular beads 2 with respective fillers 3; and a toroidal reticulated structure 4 connecting beads 2. Structure 4 comprises a number of reinforcing elements extending between and substantially radially in relation to beads 2.

In the example shown, the reinforcing elements are formed from a single continuous cord 5 wound in such a manner as to form a succession of substantially identical groups 6 of the reinforcing elements. Each group 6 is defined by a first and second U-shaped loop 7 and 8, oppositely oriented in relation to annular interconnection line 9. Line 9 lies substantially in a plane between the planes of beads 2, and, as in the example shown, loops 7 and 8 are preferably of the same length, so that line 9 is located substantially halfway between the planes of beads 2.

Each loop 7, 8 presents an open end 10 and a closed end 11 with each loop, during formation, being is wound about respective bead 2 and filler 3 so as to form a respective tubular annular structure 12 enclosing respective bead 2 and defining substantially half of structure 4 as best shown in FIG. 1.

More specifically, each loop 7, 8 is arranged with both ends 10 and 11 along line 9, and with open end 10 engaging closed end 11 of the other loop 8, 7, so as to connect tubular structures 12 by means of a succession of interconnections 13 along line 9.

Carcass 1 as described above is preferably formed on a supporting frame 14. Frame 14 comprises an inner portion 15 defined by beads 2 and forming the skeleton of carcass 1. A removable auxiliary outer portion 16 is defined by two rings 17, each consisting, in a known manner not shown, of a number of releasably-connected curved segments. Portion 16 is located between and radially outwards in relation to beads 2, so as to define, with beads 2, two annular openings 18.

When forming structure 4, frame 14 is preferably rotated about its axis, and structure 4 is woven about beads 2 and outwards of portion 16. More specifically, each loop 7, 8 presents an intermediate portion wound about respective bead 2, while respective open end 10 and closed end 11 extend respectively, outwards of frame 14 and through respective opening 18, up to respective interconnections 13 outwards of portion 16.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of producing a toroidal road vehicle tire carcass comprising two parallel annular beads, and a toroidal reticulated structure connecting the two beads and comprising a number of elongated reinforcing elements located between and extending substantially radially in relation to the beads; said method comprising the steps of forming said elongated reinforcing elements from a single continuous cord wound in such a manner as to form a succession of substantially identical groups of elongated reinforcing elements, wherein each group is defined by a first and second U-shaped loop having respective open ends and respective closed ends arranged side by side in an alternating manner along an annular interconnection line lying substantially in a plane between the bead planes; and said single continuous cord being wound about a respective one of said beads during formation of the first and second loops, and having the open end engaging the closed end of the other loop.

2. A method as claimed in claim 1 wherein said continuous cord is so wound that the loops in each said group are substantially the same length, so that said interconnection line is located substantially centrally in relation to the bead planes.

3. A method as claimed in claim 1 further comprising the steps of forming a supporting frame for the carcass;

said frame comprising an inner portion defined by the two beads and forming the skeleton of said carcass, and a removable auxiliary outer portion located between and radially outwards in relation to the beads; and weaving said reticulated structure about the beads and outwards of the auxiliary outer portion.

4. A method as claimed in claim 3 wherein each loop is wound about a respective bead, and the open and closed ends are drawn towards the interconnection line for forming, with the adjacent loops in each adjacent group in said succession of substantially identical groups, a tubular structure woven about the respective bead and connected to the tubular structure of the other bead along said interconnection line.

5. A method as claimed in claim 3 wherein said inner and outer portions define two annular openings; each of said loops comprising an intermediate portion wound about a respective bead, the open and closed ends of said loop being wound respectively outwards and through a respective said opening.

* * * * *